(12) United States Patent
Moon (10) Patent No.: US 12,214,745 B2
(45) Date of Patent: Feb. 4, 2025

(54) VEHICLE SENSOR DEVICE AND SEAT BELT RETRACTOR EMPLOYING SAME

(71) Applicant: Autoliv Development AB, Vargarda (SE)

(72) Inventor: Chan Ki Moon, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/547,270

(22) PCT Filed: Dec. 9, 2021

(86) PCT No.: PCT/KR2021/018595
§ 371 (c)(1),
(2) Date: Aug. 21, 2023

(87) PCT Pub. No.: WO2022/181942
PCT Pub. Date: Sep. 1, 2022

(65) Prior Publication Data
US 2024/0051494 A1   Feb. 15, 2024

(30) Foreign Application Priority Data
Feb. 26, 2021   (KR) .................. 10-2021-0026516

(51) Int. Cl.
*B60R 22/46* (2006.01)
*G01C 9/10* (2006.01)

(52) U.S. Cl.
CPC ............ *B60R 22/46* (2013.01); *G01C 9/10* (2013.01); *G01C 2009/107* (2013.01)

(58) Field of Classification Search
CPC . B60R 22/40; B60R 22/46; B60R 2022/3402; B60R 2022/402; G01C 9/10; G01C 2009/107
See application file for complete search history.

(56) References Cited

U.S. PATENT DOCUMENTS 3,995,788 A * 12/1976 Stephenson ............. B60R 22/40
242/384.4
4,135,683 A * 1/1979 Stephenson ............. B60R 22/40
280/806

(Continued)

FOREIGN PATENT DOCUMENTS

JP   2011-016480 A   1/2011
JP   2011-116296 A   6/2011

(Continued)

*Primary Examiner* — Laura Freedman
(74) *Attorney, Agent, or Firm* — DICKINSON WRIGHT PLLC (57) ABSTRACT

A vehicle sensor device comprising: a weight body housing installed in a body so as to be rotatable around a shaft coupled to the body, a weight body being installed in the weight body housing, a ball assembly for sensing a change in inclination of a vehicle, a sensor housing in which the ball assembly is movably installed, and a sensor lever installed in the sensor housing and rotated by the movement of the ball assembly. The sensor lever is configured to linearly reciprocate, by rotation, a pilot lever provided in a locking device. The sensor lever is installed in the sensor housing to which the ball assembly is coupled. The sensor lever is rotated around a hinge shaft by the movement of the ball assembly according to a change in inclination of the vehicle to linearly reciprocate the pilot lever connected to the sensor lever.

15 Claims, 8 Drawing Sheets

(56) References Cited

U.S. PATENT DOCUMENTS

| | | | |
|---|---|---|---|
| 5,495,994 A | 3/1996 | Rumpf et al. | |
| 5,716,102 A * | 2/1998 | Ray | B60R 22/26 |
| | | | 297/216.13 |
| 5,882,084 A * | 3/1999 | Verellen | B60R 22/40 |
| | | | 297/483 |
| 6,443,382 B1 | 9/2002 | Bae | |
| 6,499,554 B1 | 12/2002 | Yano et al. | |
| 6,578,419 B1 * | 6/2003 | Murayama | G01P 1/00 |
| | | | 242/384.6 |
| 6,915,979 B2 * | 7/2005 | Webber | B60R 22/40 |
| | | | 242/384.4 |
| 6,923,506 B2 * | 8/2005 | Tanabe | B60R 22/405 |
| | | | 297/480 |
| 7,427,044 B2 * | 9/2008 | Takamatsu | B60R 22/4676 |
| | | | 242/382 |
| 7,731,118 B2 * | 6/2010 | Ruff | B60R 22/405 |
| | | | 242/384.6 |
| 8,690,258 B2 * | 4/2014 | Kato | B60N 2/688 |
| | | | 297/473 |
| 9,027,864 B2 * | 5/2015 | Yamazoe | B60R 22/4633 |
| | | | 242/379 |
| 9,079,563 B2 * | 7/2015 | Ito | B60R 22/40 |
| 9,302,645 B1 | 4/2016 | Shenaq et al. | |
| 10,793,104 B2 * | 10/2020 | Jabusch | B60R 22/40 |
| 10,946,831 B2 * | 3/2021 | Hall | B60R 22/4628 |
| 11,148,635 B2 * | 10/2021 | Ito | B60R 22/40 |
| 2015/0084323 A1 * | 3/2015 | Han | B60R 22/18 |
| | | | 280/807 |
| 2024/0278746 A1 * | 8/2024 | Hong | B60R 22/46 |

FOREIGN PATENT DOCUMENTS

| | | |
|---|---|---|
| JP | 5738648 B2 | 6/2015 |
| KR | 10-0475591 B1 | 3/2005 |
| KR | 10-2013-0119682 A | 11/2013 |
| KR | 10-1766844 B1 | 8/2017 |
| KR | 10-2024048 B1 | 9/2019 |
| KR | 10-2020-0103557 A | 9/2020 |
| KR | 10-2020-0106973 A | 9/2020 |
| KR | 102551626 B1 * | 7/2023 |

\* cited by examiner

PRIOR ART

VEHICLE SENSOR DEVICE AND SEAT BELT RETRACTOR EMPLOYING SAME

CROSS-REFERENCE TO RELATED APPLICATIONS

This application is a 35 U.S.C. § 371 national phase of PCT International Application No. PCT/KR2021/018595, filed Dec. 9, 2021, which claims the benefit of priority under 35 U.S.C. § 119 to Republic of Korea Patent Application No. 10-2021-0026516, filed Feb. 26, 2021, the contents of which are incorporated herein by reference in its entirety.

TECHNICAL FIELD

The disclosure relates to a seat belt retractor, and more particularly, to a vehicle sensor device which detects a change in an inclination of a vehicle and prevents a seat belt from being pulled out, and a seat belt retractor employing the same.

BACKGROUND

In general, a vehicle is equipped with a seat belt safety device in a seat to ensure the safety of an occupant.

The seat belt safety device includes a retractor configured to wind a band-shaped seat belt webbing (hereinafter, referred to as a 'webbing') on a spool or to pull out the webbing for restraining an occupant, and a buckle into which a tongue fixed at one end of the webbing is detachably inserted.

The retractor prevents the occupant wearing the seat belt from being bounced forward or moved away from a seat due to driving inertia when the vehicle suddenly stops or rapidly accelerates due to a vehicle accident. Such a retractor may include a device that allows the webbing to be pulled out in a normal state when the occupant wears the seat belt, but, when a change in the pull-out acceleration of the webbing or the inclination of the vehicle is detected due to a vehicle collision, prevents the webbing from being further pulled out, and an emergency tensioning device and a pretensioning device that reduce looseness or hanging of the webbing, that is, slack of the webbing.

For example, in Patent Document 1 and Patent Document 2 below, a retractor technique for controlling winding and unwinding operations of a seat belt webbing is disclosed.

Meanwhile, when an acceleration exceeding a predetermined value is applied to the retractor in the horizontal direction or the inclination of the vehicle is changed, such as when the vehicle collision occurs, a vehicle sensor that detects the acceleration or inclination is applied to the retractor to prevent the seat belt from being pulled out by operating a locking device of the seat belt.

A vehicle sensor using a ball as an inertial member or an independent inertial member is generally known in the art.

For example, the vehicle sensor includes an inertial member that moves in a dangerous situation where a deceleration higher than a normal deceleration of the webbing or an inclination is applied to the vehicle, and a sensor lever that is moved by the inertia member and interworks with external teeth of a control disc which rotates together with a spool of the seat belt retractor.

Such a seat belt retractor may be mounted in a vehicle body, for example, a center pillar of the vehicle, a backrest of a seat, a rear pillar, etc. Accordingly, a mounting posture of the seat belt retractor may be variously changed according to a structure of the center pillar, the backrest of the seat, the rear pillar, etc. That is, the seat belt retractor is not always mounted in a horizontal state, and may be mounted in a state in which it is inclined from the horizontal state by a predetermined angle in a left-right direction or a front-rear direction.

In particular, when the seat belt retractor is installed in the backrest of the seat, the inclination of the seat belt retractor may be changed according to rotation of the backrest.

However, if the posture of the related-art seat belt retractor is changed over a certain range, an acceleration and an inclination cannot be properly detected.

For example, when the seat belt retractor having the vehicle sensor has a posture that is inclined from the horizontal state over a certain range, a distance between the control disc and the sensor lever of the vehicle sensor becomes too close, so the sensor lever operates sensitively, so that the locking operation cannot be properly performed.

In addition, when the seat belt retractor having the vehicle sensor is mounted in the backrest of the seat, and the backrest of the seat is inclined toward the front side of the vehicle, the sensor lever of the vehicle sensor is caught by the external teeth of the control disc, thereby restricting the rotation of the spool.

For this reason, when an occupant wants to wear the seat belt, it may not be possible to wear the seat belt because the rotation of the spool is restricted.

In order to solve the above problem, the applicant of the present invention has filed a patent application that discloses a seat belt retractor having a vehicle sensor with an improved fixing structure in Patent Document 3 below, which is now registered.

Meanwhile, as autonomous vehicles are developing recently, a technology for minimizing volumes of a seat and a seat belt retractor which are applied to a vehicle is developing.

In addition, an integrated seat belt (Belt In Seat (BIS)) that is integrated into a seat may be applied.

The vehicle sensor of the related-art seat belt retractor measures the inclination of a vehicle by applying a gimbal having a weight therein.

Such a vehicle sensor may measure the inclination of the vehicle even if the angle of the backrest provided on the seat is changed.

However, when a rotation angle of the seat in which the related-art seat belt retractor is installed, for example, a rotation of the backrest, exceeds a predetermined angle range, the sensor lever connected with the gimbal may not properly control a pilot lever, causing a problem that it is impossible to perform a normal operation.

Accordingly, there is a need for development of a seat belt retractor employing a vehicle sensor, which can extend an angle range in which a normal operation is possible, by minimizing an abnormal operation range caused by rotation of a backrest.

(Patent Document 1) U.S. Pat. No. 6,499,554 (registered on Dec. 31, 2002) (Patent Document 2) U.S. Pat. No. 6,443,382 (registered on Sep. 3, 2002)

(Patent Document 3) Korean Patent Registration No. 10-1766844 (issued Aug. 9, 2017)

SUMMARY

An object of the disclosure is to solve the above-described problems, and is to provide a vehicle sensor device for detecting a change in an inclination of a vehicle, and a seat belt retractor employing the same.

Another object of the disclosure is to provide a vehicle sensor device which can extend an angle range in which a normal operation is possible by controlling a pilot lever regardless of a rotation angle and an installation angle of a backrest, and a seat belt retractor employing the same.

Still another object of the disclosure is to provide a vehicle sensor device which can detect an inclination of a vehicle and an angle of a seat backrest by applying one ball, and a seat belt retractor employing the same.

To achieve the above-described objects, a vehicle sensor device according to the disclosure may include: a body forming an exterior; a cover coupled to one opened surface of the body; a weight body housing installed in the body to be rotatable about a shaft that is coupled to the body according to an installation angle and an inclination of the body, the weight body housing having a weight body installed therein; a ball assembly configured to detect the change in the inclination of the vehicle; a sensor housing installed to allow the ball assembly to move therein; and a sensor lever installed in the sensor housing and rotated by a movement of the ball assembly, and the sensor lever may linearly reciprocate, by rotation, a pilot lever provided in a locking device.

In addition, to achieve the above-described objects, a vehicle sensor device according to the disclosure may include: a body forming an exterior; a cover coupled to one opened surface of the body; a sensor housing installed in the body to be rotatable about a shaft that is coupled to the body according to an installation angle and an inclination of the body; a ball installed in the sensor housing to detect the change in the inclination of the vehicle; a lever guide installed on an upper portion of the ball; and a sensor lever rotatably installed in the sensor housing, and the sensor lever may linearly reciprocate, by rotation caused by a movement of the ball, a pilot lever provided in a locking device.

In addition, to achieve the above-described objects, a seat belt retractor employing a vehicle sensor device according to the disclosure may include: a vehicle sensor device configured to detect a change in an inclination of a vehicle; a spindle device including a spindle on which a seat belt webbing is wound; and a locking device configured to perform a locking operation to prevent the seat belt webbing from being pulled out upon a vehicle collision, and the vehicle sensor device may linearly reciprocate a pilot lever to be coupled to or decoupled from the locking device, based on the detected change in the inclination of the vehicle.

According to the vehicle sensor device and the seat belt retractor employing the same according to the disclosure as described above, the sensor lever is installed in the sensor housing to which the ball assembly is coupled, and the pilot lever connected with the sensor lever can be reciprocally moved by rotating the sensor lever about the hinge shaft according to the movement of the ball assembly caused by a change in the inclination of the vehicle.

In particular, according to the disclosure, a locking portion is provided on the pilot lever, and a locking recess provided on an upper end of the sensor lever is coupled to the locking portion, so that the pilot lever can be normally controlled to linearly reciprocate regardless of an installation angle of the vehicle sensor device.

That is, according to the disclosure, there is an effect of normally controlling the pilot lever within a range in which an installation angle of the sensor device is +90°, that is, 180°, with reference to a reference position.

In addition, according to the disclosure, the weight body and the weight body housing for detecting an inclination of a backrest may be omitted, and a change in the inclination of the vehicle can be detected by using the ball and the sensor housing, and the pilot lever can be controlled by rotating the sensor lever.

DETAILED DESCRIPTION

Hereinafter, a seat belt retractor having a vehicle sensor device according to preferred embodiments of the disclosure will be described in detail with reference to the accompanying drawings.

Prior to explaining a configuration of the seat belt retractor according to preferred embodiments of the disclosure, a configuration of a seat belt retractor according to related-art technology will be roughly explained with reference to FIG. 1.

Figure 1:
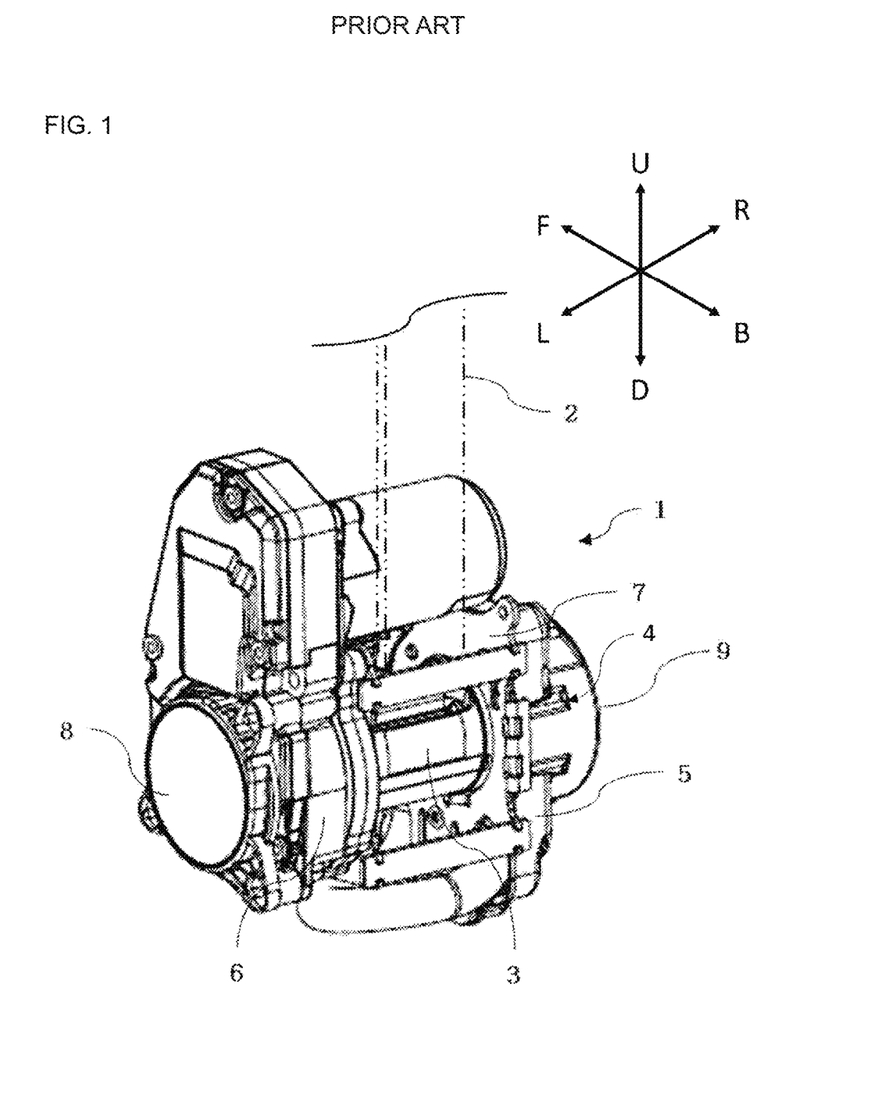
FIG. 1 is a view illustrating an example of a related-art seat belt retractor.

FIG. 1 is a view illustrating an example of a related-art seat belt retractor.

In the following descriptions, a direction in which a steering wheel is installed with reference to a seat is referred to as a 'forward direction,' and the opposite direction thereof is referred to as a 'backward direction.' In addition, terms indicating directions such as 'left side,' 'right side,' 'upward direction,' and 'downward direction' are defined to indicate respective directions with reference to the forward direction and the backward direction described above.

As shown in FIG. 1, the related-art seat belt retractor 1 may include a spindle 3 on which a seat belt webbing (hereinafter, referred to as a 'webbing') 2 is wound, a sensor unit 4 that detects an inclination of the vehicle, an emergency tensioning unit 5 that reduces slack by winding the webbing 2 upon a vehicle collision, and a pretensioning unit 6 that smoothly pulls out the webbing 2 during normal driving of the vehicle and reduces slack by winding the webbing 2 just before a vehicle collision.

The sensor unit 4 detects a change in the pull-out acceleration of the webbing or a change in the inclination of the vehicle caused by a vehicle collision.

The emergency tensioning unit 5 may operate an inflater (not shown) having gunpowder embedded therein according to a detection signal that detects a vehicle collision, and may wind the webbing 2 on the spindle 3 by using a pressure of a generated gas. Accordingly, the emergency tensioning unit 5 may reduce an injury value of a passenger by reducing slack of the webbing 2 by winding the webbing 2 upon a vehicle collision.

When a vehicle collision is predicted through a sensor applied to the vehicle, the pretensioning unit 6 may wind the webbing 2 on the spindle by operating a motor which is capable of rotation and reverse rotation. That is, when the vehicle travels normally, the pretensioning unit 6 may keep the tension of the worn webbing 2 and prevent the webbing 2 from being loosened without occurrence of an accident until a stronger acceleration or deceleration of the vehicle occurs, and may reduce an injury value of a passenger by reducing slack of the webbing 2 by winding the webbing 2 just before a vehicle collision.

Herein, the spindle 3 is installed inside a fixing frame 7, and the sensor unit 4, the emergency tensioning unit 5, and the pretensioning unit 6 are disposed on both sides of the fixing frame 7, and left and right housings 8, 9 are coupled to the outside of each unit.

That is, the respective units 4, 5, 6 are disposed on both sides of the spindle 2 along a traverse direction.

In the related-art seat belt retractor 1 described above, the spindle is installed in the backrest of the seat along a width direction, that is, a left-right direction. Therefore, as the length of the webbing 2 wound on the spool increases, a thickness in a front-rear direction (hereinafter, referred to as a 'thickness') also increases, and hence, there is a problem that it is difficult to apply the seat belt retractor to a backrest of a slim seat.

To solve this problem, the disclosure minimizes a thickness of a seat belt retractor by rotating an installation direction of a spindle on which a webbing is wound, thereby applying the seat belt retractor to a slim seat.

Along this, the disclosure can solve a problem of insecure connection between a sensor lever and a pilot lever, which arises according to a rotation angle of a gymbal, by enhancing a structure of a vehicle sensor device.

Hereinafter, a configuration of a seat belt retractor employing a vehicle sensor device according to a preferred embodiment of the present disclosure will be briefly described with reference to FIGS. 2 to 3.

Figure 2:
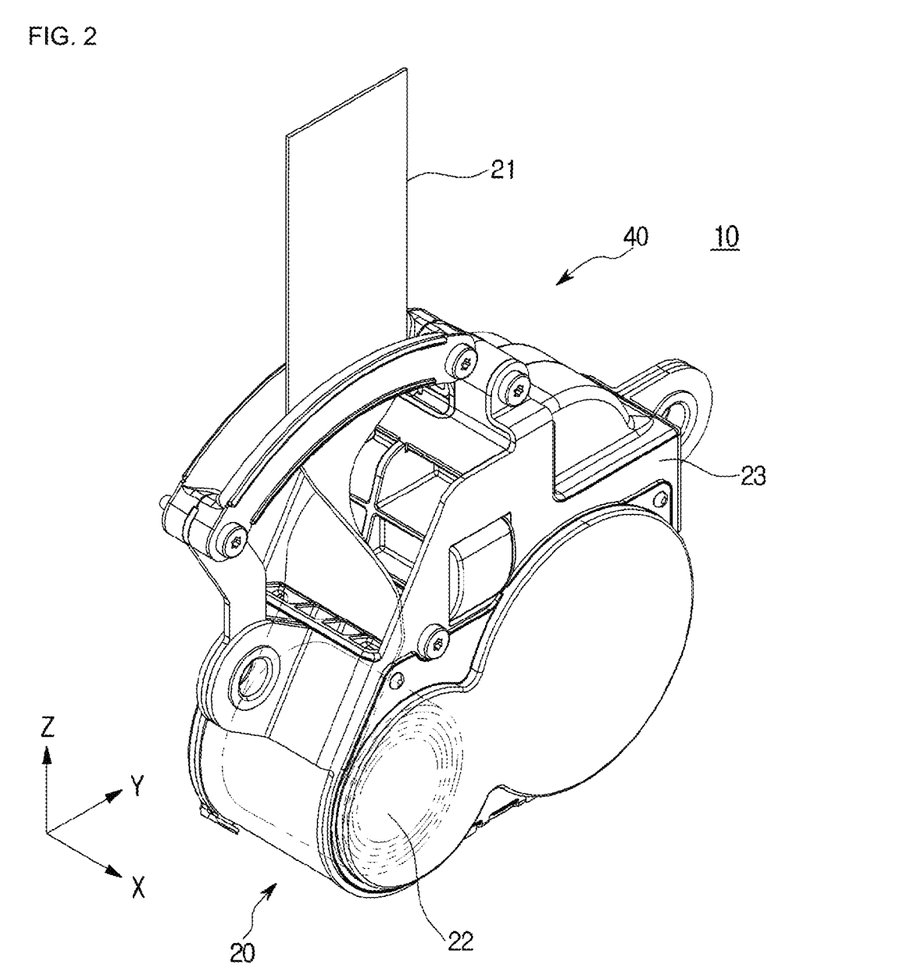
FIG. 2 is a perspective view of a seat belt retractor employing a vehicle sensor device according to a preferred embodiment of the disclosure.
Figure 3:
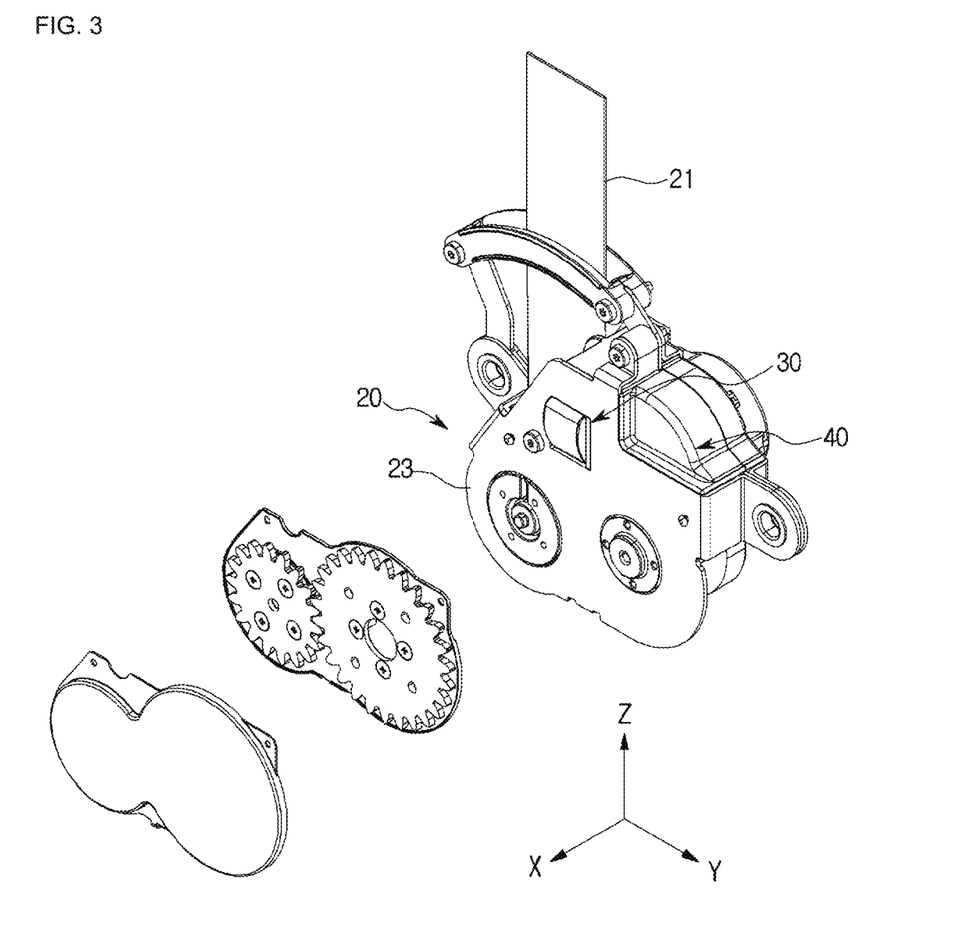
FIG. 3 is a partial exploded perspective view of the seat belt retractor shown in FIG. 2.

FIG. 2 is a perspective view of a seat belt retractor employing a vehicle sensor device according to a preferred embodiment of the disclosure, and FIG. 3 is a partial exploded perspective view of the seat belt retractor shown in FIG. 2.

In the present embodiment, a configuration of a seat belt retractor applied to an integrated seat belt (BIS) that is integrally mounted in a seat will be described.

Of course, the disclosure is not limited thereto, and it should be noted that seat belt retractors of various structures and shapes may be provided to be applied not only to an integrated seat belt but also to a normal vehicle or an autonomous vehicle.

As shown in FIGS. 2 and 3, the seat belt retractor 10 employing the vehicle sensor device according to a preferred embodiment of the disclosure may include a spindle device 20, a vehicle sensor device (hereinafter, referred to as a 'sensor device') 30, and a locking device 40.

Along with these, the seat belt retractor 10 may further include a pretensioning device that reduces slack by winding a webbing 21 just before a vehicle collision.

The spindle device 20 and the sensor device 30 are basic modules that constitute the seat belt retractor 10, and may be fabricated as separate modules and assembled, or may be integrated into one module and provided.

The spindle device 20 is provided with a spindle 22 on which the webbing 21 is wound, and the spindle device and the sensor device may be installed inside a housing 23.

The sensor device 30 may include an acceleration sensor that detects a change in the pull-out acceleration of the webbing 21, or an inclination sensor that detects a change in the inclination of the vehicle.

In the present embodiment, a configuration of the sensor device 30 to which the inclination sensor to detect the inclination of the vehicle is applied will be described in detail with reference to FIGS. 4 to 5.

Figure 4:
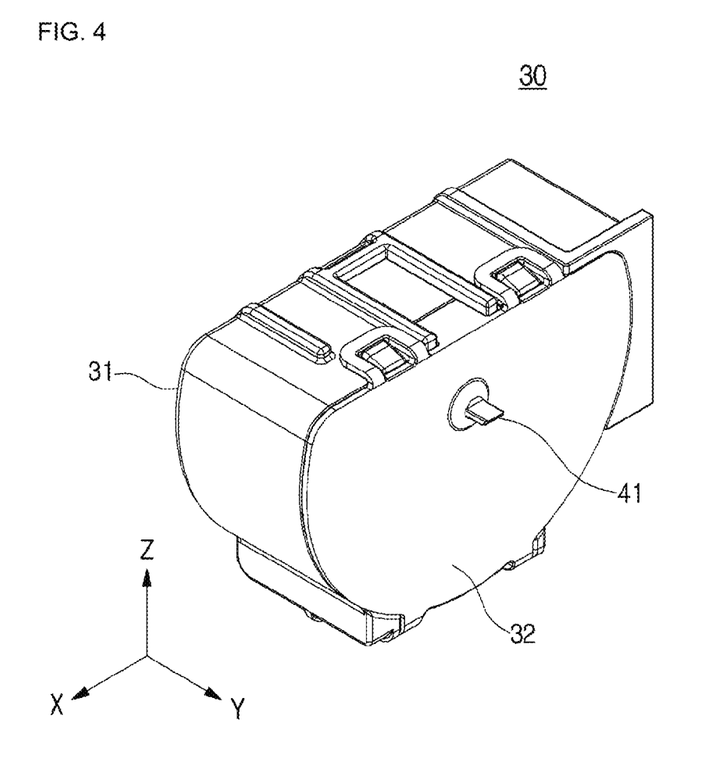
FIG. 4 is a perspective view of the vehicle sensor device according to a preferred embodiment of the disclosure.
Figure 5:
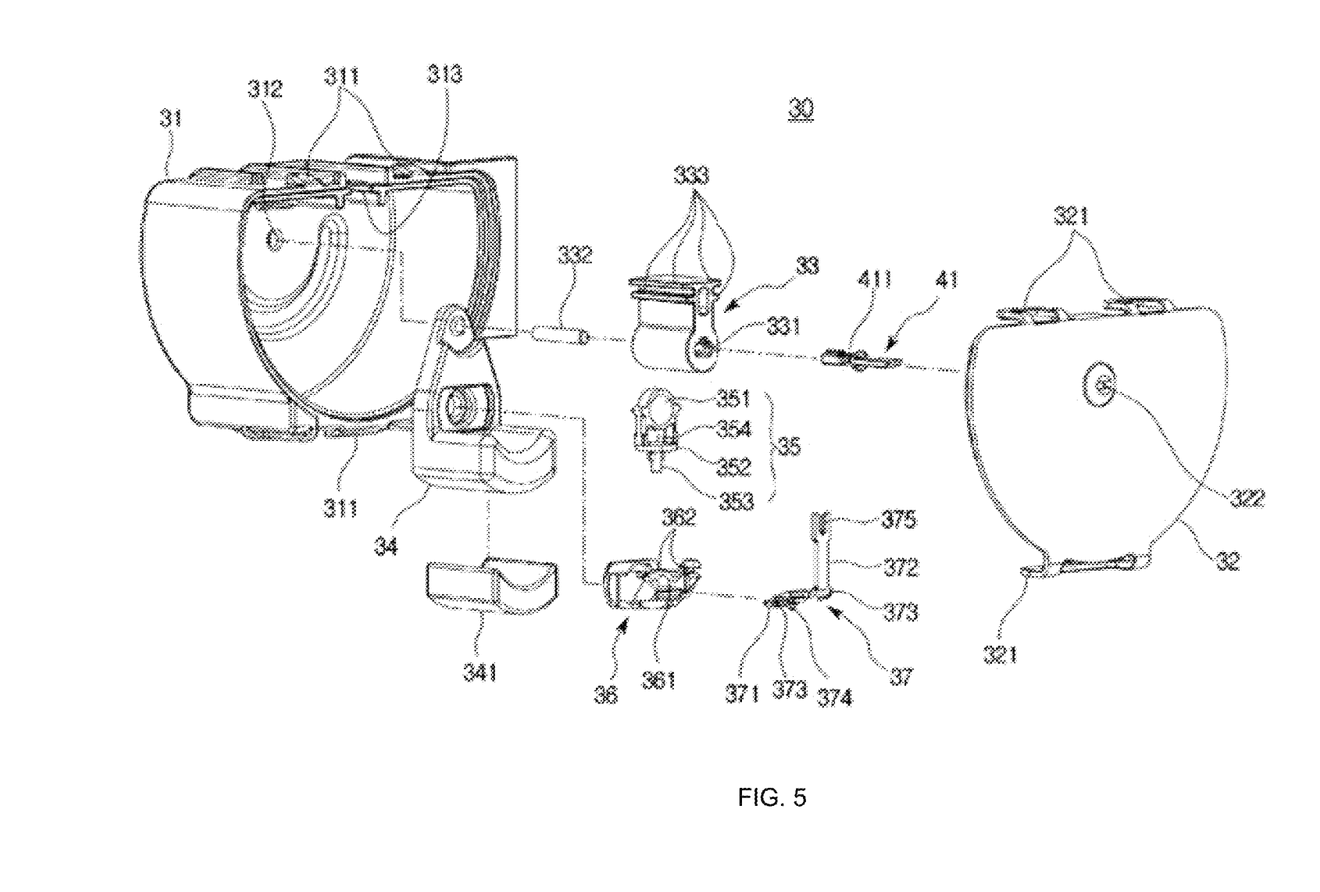
FIG. 5 is an exploded perspective view of the vehicle sensor device shown in FIG. 4.

FIG. 4 is an enlarged view of the sensor device shown in FIG. 2, and FIG. 5 is an exploded perspective view of the sensor device shown in FIG. 4.

In the present embodiment, a configuration of a sensor device applied to the configuration of the seat belt retractor shown in FIGS. 2 to 3 will be explained.

Of course, the disclosure is not limited to the above-described configuration, and it should be noted that the disclosure may be changed to be applied to seat belt retractors having various configurations such as the seat belt retractor, etc. shown in FIG. 1.

As shown in FIGS. 4 and 5, the vehicle sensor device 30 employed in the seat belt retractor according to a preferred embodiment of the disclosure may include a body 31 that forms an exterior, a cover 32 that is coupled to one opened surface of the body 31, a weight body housing 34 that is installed in the body 31 to be rotatable about a shaft 33 which is coupled to the body 31 according to an installation angle of the body 31, and has a weight body 341 installed therein, a ball assembly 35 that detects a change in the inclination of a vehicle in which the sensor device 30 is installed, a sensor housing 36 in which the ball assembly 35 is movably installed, and a sensor lever 37 that is installed in the sensor housing 36, and is rotated by a movement of the ball assembly 35 to move a pilot lever 41.

The body 31 may have one surface opened, and may be formed in a semi-cylindrical shape having a substantially semicircular cross section when viewed from a side.

One or more locking protrusions 311 may be formed on an upper end and a lower end of the body 31, respectively, and one or more locking recess portions 321 may be formed on an upper end and a lower end of the cover 32 to allow the locking protrusions 311 to be locked thereinto.

The body 31 and the cover 32 may be disposed along an installation direction of the spindle 22, that is, along the X-axis direction, while being coupled to each other.

The shaft 33 may be installed in the body 31 along the Y-axis direction to be perpendicular to the spindle 22.

The weight body housing 34 functions to rotate according to an angle in which the sensor device is installed in a backrest of a seat, and a rotation angle of the backrest.

To achieve this, a rotation shaft 332 is installed on an upper end of the weight body housing 34 along the Y-axis direction to be coupled to a shaft hole 312 formed on an inner surface of the body 31, and to the shaft 33, and the shaft hole 312 may be formed in the body 31 to have the rotation shaft 332 to be coupled thereto.

Figure 9:
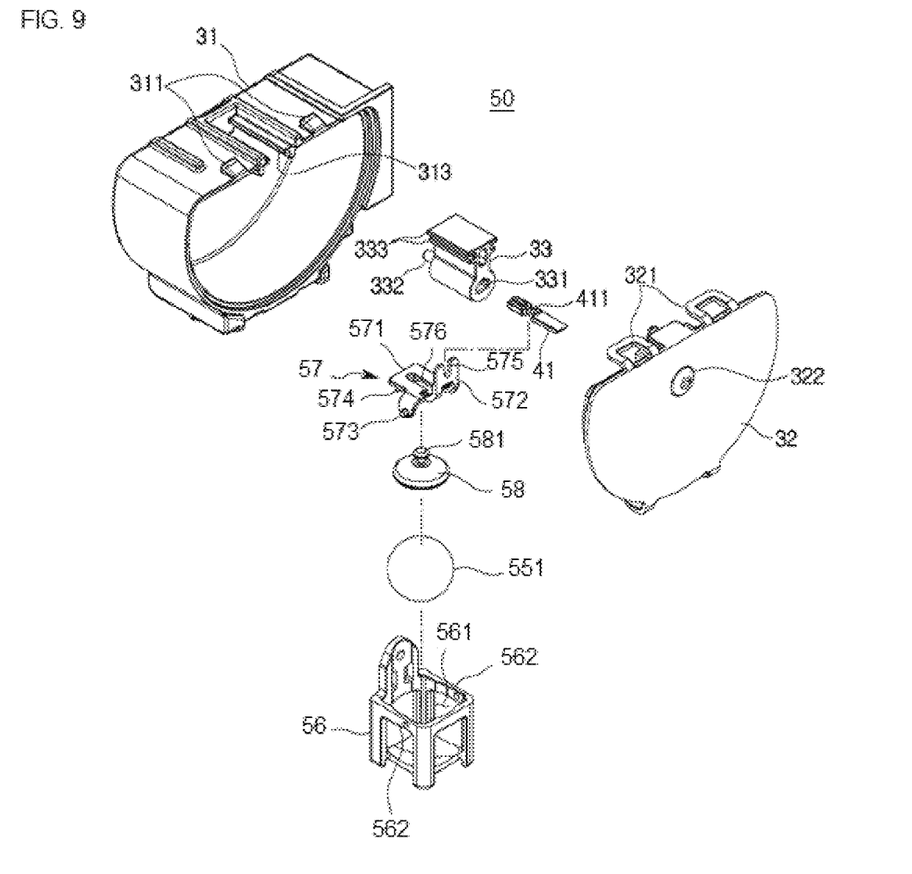
FIG. 9 is an exploded perspective view of a vehicle sensor device according to another embodiment of the disclosure.

In addition, the shaft 33 is formed in a substantially cylindrical shape to have a coupling space 331 formed in a center thereof to allow the rotation shaft 332 to be coupled thereto, and the pilot lever 41 may be coupled to one end of the coupling space 331 formed in the shaft 33, that is, the right end when viewed on FIG. 9, to be movable along the Y-axis direction.

One pair of mounting ribs 333 may be formed on front and rear surfaces of an upper end of the shaft 33 in parallel one on the other along the left-right direction so as to be coupled to an upper end of the body 31, and a mounting recess 313 may be formed on an upper end of the body 31 to allow the upper end of the shaft 33 to be mounted thereon.

Therefore, the shaft 33 is coupled to the upper end of the body 31 by using the one pair of mounting ribs 333, and performs a center shaft function to allow the weight body housing 34 to rotate thereabout.

Meanwhile, the pilot lever 41 linearly reciprocates in the coupling space 331, which is formed in the shaft 33, along the Y-axis direction according to rotation of the sensor lever 37.

Figure 8:
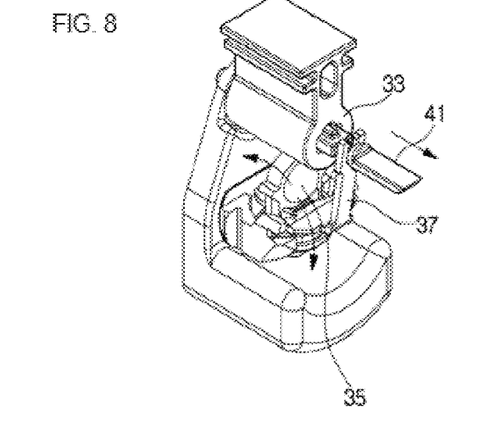

That is, when the pilot lever 41 moves to the right as viewed on FIG. 8, a right end of the pilot lever 41 is engaged with any one of a plurality of protrusions formed on an outer circumference of a steering disk (not shown) provided in the locking device 40, so that the locking device 40 performs a locking operation to prevent the webbing 21 from being pulled out.

On the other hand, when the pilot lever 41 moves to the left, the pilot lever 41 and the locking device 40 are decoupled from each other, so that the webbing 21 can be freely pulled out.

To achieve this, a penetrating hole 322 may be formed on the cover 32 to allow the pilot lever 41 to move along the Y-axis direction and to protrude to the right.

The ball assembly 35 functions to detect a change in the inclination of the vehicle in which the sensor device 30 is installed while being installed in the sensor housing 36.

That is, the ball assembly 35 may include a ball 351 having a weight, and an installation member 352 on which the ball 351 is installed.

An installation space may be formed in a center of the installation member 352 to allow the ball 351 installed therein, and a coupling protrusion 353 protrudes from a lower end of the installation member 352 to be coupled to the sensor housing 36 to be freely movable.

In addition, an insertion space 354 may be formed on the installation member 352 between the installation space and the coupling protrusion 353 to allow a horizontal portion 371 of the sensor lever 37, which will be described below, to be inserted thereinto.

Preferably, the insertion space 354 may be formed larger than a width and a thickness of the horizontal portion 371 to allow the sensor lever 37 coupled to the inside to smoothly rotate.

The sensor housing 36 has an upper surface opened, and the coupling protrusion 353 of the ball assembly 35 may be mounted in the center of the sensor housing 36.

One pair of shaft coupling holes 362 may be formed on front and rear sidewalls of the sensor housing 36 to allow one pair of hinge shafts 373 formed at front and rear ends of the sensor lever 37 to be coupled thereto, respectively.

The sensor lever 37 may be formed in a substantially ']' shape in cross section when viewed from the front.

That is, the sensor lever 37 may include the horizontal portion 371 disposed horizontally, and a vertical portion 372 that is disposed at a right end of the horizontal portion 371 and extends vertically in an upward direction.

In addition, the hinge shafts 373 may protrude from front and rear surfaces of the right end of the horizontal portion 37 to be coupled to the shaft coupling holes 362 formed on the front and rear sidewalls of the sensor housing 36, respectively.

The horizontal portion 371 may be inserted into the insertion space 354 formed on the installation member 352 of the ball assembly 35, and a support protrusion 374 may be formed on a lower surface of the horizontal portion 371.

The support protrusion 374 is supported by a weight exerted by the ball assembly 35 before the inclination of the vehicle is changed, so that the horizontal portion 371 maintains horizontality.

On the other hand, when the inclination of the vehicle is changed and the ball assembly 35 moves, the horizontal portion 37 loses a supporting force of the support protrusion 374 due to a change in the center of mass, and accordingly, may not maintain horizontality.

To this end, the sensor lever 37 rotates about the hinge shaft 373 in the clockwise direction, thereby moving the pilot lever 41 to the right.

To achieve this, a locking recess portion 375 may be formed on an upper end of the vertical portion 372 to allow a locking portion 411 formed on a center of the pilot lever 41 to be rotatably locked thereinto.

The locking recess portion 375 may have a locking recess formed on a center thereof, so that its cross section is formed in a substantially 'U' shape.

Herein, a left portion of the pilot lever 41 may be formed in a shape corresponding to a cross-sectional shape of the coupling space 331 formed in the shaft 33, for example, in a substantially rectangular shape.

A right portion of the pilot lever 41 may be formed in a shape corresponding to a cross-sectional shape of the penetrating hole 322 formed on the cover 32.

In addition, the locking portion 411 that is formed to have a diameter smaller than the left portion and the right portion of the pilot lever 41 is provided on a center of the pilot lever 41 to be locked into the locking recess portion 375 of the sensor lever 37.

Therefore, with the locking portion 441 being locked into the locking recess portion 375 of the sensor lever 37, the pilot lever 41 linearly reciprocates between the shaft 33 and the cover 32 by rotation of the sensor lever 37 about the one pair of hinge shafts 373.

Hereinafter, an operating method of the vehicle sensor device according to a preferred embodiment of the present disclosure will be described in detail with reference to FIGS. 6 to 8.

Figure 6:
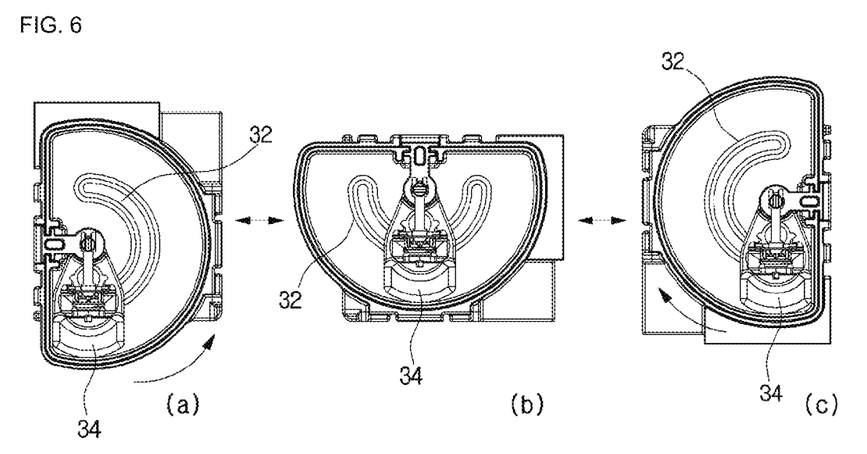
FIG. 6 is an operational state view of the vehicle sensor device installed at various angles.
Figure 7:
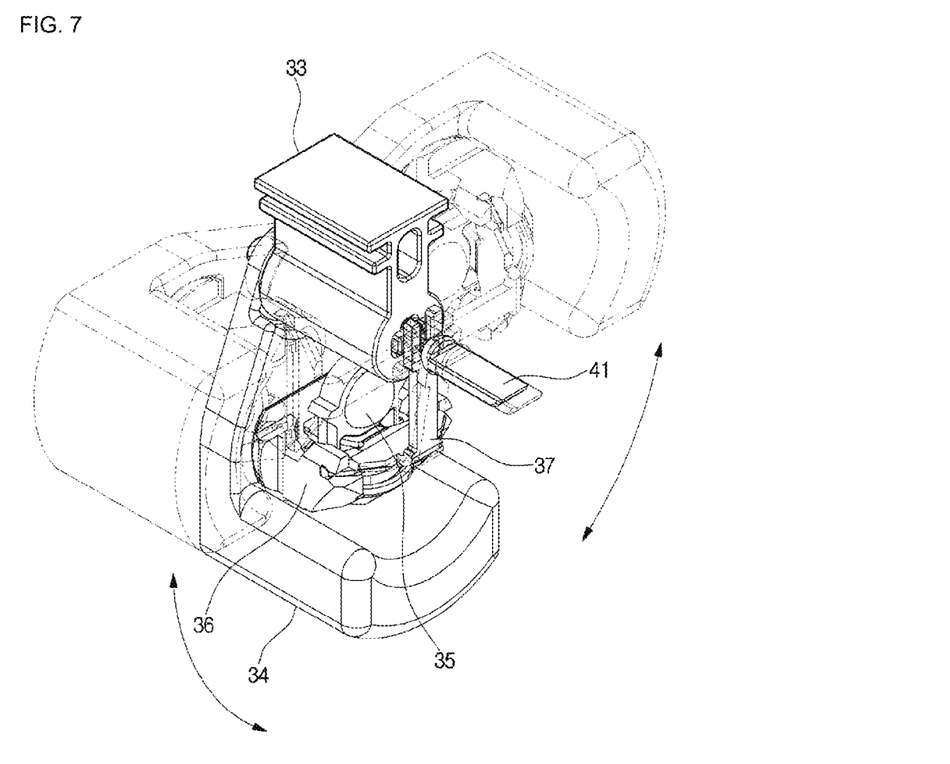
FIGS. 7 and 8 are views to explain operating methods of a weight body housing, a sensor lever, and a pilot lever provided in the sensor device, respectively.

FIG. 6 is an operational state view of the sensor device installed at various angles, and FIGS. 7 and 8 are views to explain operating methods of the weight body housing, the sensor lever, and the pilot lever provided in the sensor device, respectively.

View (b) of FIG. 6 illustrates a state in which the sensor device is installed at a reference position with reference to the shaft, and views (a) and (c) of FIG. 6 illustrate a state in which the sensor device is rotated about the shaft by 90° in the counter clockwise direction and the clockwise direction, respectively.

FIG. 7 illustrates a state before the sensor lever rotates, and FIG. 8 illustrates a state in which the sensor lever rotates about the hinge shaft in the clockwise direction.

The sensor device 30 may be installed at various rotation angles according to an environment in which the sensor device is installed in the vehicle as shown in FIG. 6.

In this case, the weight body housing 34 always maintains its vertical arrangement state constantly due to the weight of the weight body 341, regardless of an installation angle at which the body 31 and the cover 32 are installed in the backrest, and an inclination of the backrest, that is, a rotation angle.

As shown in FIG. 7, the sensor lever 37 is disposed to make the horizontal portion 371 be in a horizontal state due to the weight applied from the ball assembly 35.

Accordingly, the pilot lever 41 having the locking portion 411 locked into the locking recess portion 375 formed at the upper end of the vertical portion 372 is maintained in a state where the pilot lever is moved to the inside of the cover 32, that is, to the left.

When the pilot lever 41 moves to the left as described above, the pilot lever 41 and the locking device 40 are decoupled from each other, so that the webbing 21 can be freely pulled out.

Meanwhile, the inclination of the vehicle may be continuously changed while the vehicle is traveling, and the inclination of the backrest, that is, a rotation angle, may also be changed.

Therefore, as the inclination of the vehicle is changed, the ball assembly 35 moves over the sensor housing 36.

As described above, when the ball assembly 35 moves, the sensor lever 37 rotates about the hinge shaft 373 in the clockwise direction due to a change in the center of mass as shown in FIG. 8.

Therefore, the pilot lever 41 connected with the sensor lever 37 passes through the penetrating hole 322 formed on the cover 32, and moves to the outside of the cover 32, that is, to the right, and protrudes therefrom.

As described above, when the pilot lever 41 protrudes to the outside of the cover, the right end of the pilot lever 41 is locked into the locking device 40, so that the locking device 40 performs the locking operation to prevent the webbing 21 from being pulled out.

According to the disclosure as described above, the sensor lever is installed in the sensor housing to which the ball assembly is coupled, and the sensor lever is rotated about the hinge shaft by the movement of the ball assembly according to a change in the inclination of the vehicle, so that the pilot lever connected with the sensor lever linearly reciprocates.

Accordingly, the disclosure can control the ability to pull out the webbing by making the pilot lever protrude to the outside of the cover and coupling or decoupling the pilot lever to or from the locking device.

In particular, the locking portion is provided on the pilot lever, and the locking recess portion provided on the upper end of the sensor lever is coupled to the locking portion, so that the pilot lever can be normally controlled to linearly reciprocate regardless of an angle at which the sensor device is rotated and disposed due to adjustment of the angle of the seat backrest.

That is, the disclosure can normally control the pilot lever within a range in which an arrangement angle of the sensor device that is changed by adjustment of the angle of the seat backrest is +90°, that is, 180°, with reference to a reference position.

Although it is illustrated in the above-described embodiment that the weight body housing having the weight body installed therein is applied, the present disclosure is not limited thereto.

A configuration of a sensor device employed in a seat belt retractor according to another embodiment of the disclosure will be described in detail with reference to FIGS. 9 and 10.

Figure 10:
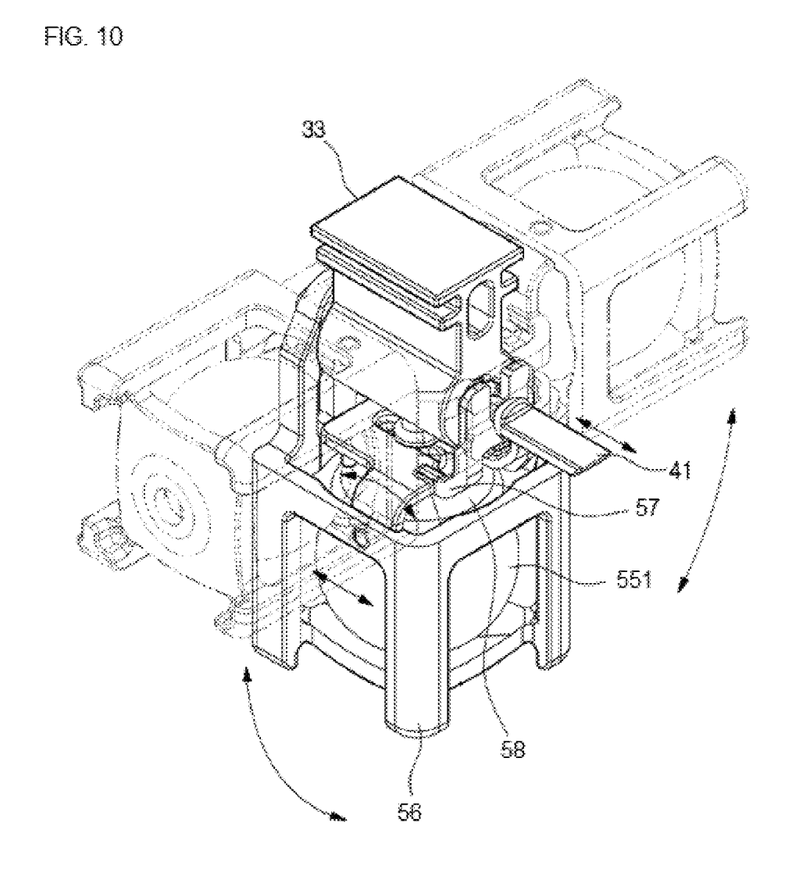
FIG. 10 is a view to explain an operating method of the vehicle sensor device shown in FIG. 9.

FIG. 9 is an exploded perspective view of a sensor device employed in a seat belt retractor according to another embodiment of the disclosure, and FIG. 10 is a view to explain operating methods of a ball assembly, a sensor lever, and a pilot lever provided in the sensor device.

As shown in FIGS. 9 and 10, the sensor device 50 employed in the seat belt retractor 10 according to another embodiment of the disclosure is similar to the sensor device 30 explained in the above-described embodiment with reference to FIGS. 4 to 8 in its configuration.

However, the sensor device 50 according to the present embodiment may omit the weight body 341 and the weight body housing 34 for detecting an installation angle in a backrest and an inclination of the backrest, and may detect a change in the inclination of the vehicle and an angle of the backrest by using a ball 551 and a sensor housing 56, and may control a pilot lever 41 by rotating a sensor lever 57.

Specifically, as shown in FIG. 9, the sensor device 50 may include a body 31 that forms an exterior, a cover 32 that is coupled to one opened surface of the body 31, a sensor housing 56 that is installed in the body 31 to be rotatable about a shaft 33 coupled to the body 31 according to an installation angle of the body 31 and an inclination of the backrest, the ball 551 that is installed in the sensor housing 56 to detect a change in the inclination of the vehicle in which the sensor device 50 is installed, a lever guide 58 that is installed on an upper portion of the ball 551, and a sensor lever 57 that is rotatably installed in the sensor housing 56, and is rotated by a movement of the ball 551 to move the pilot lever 41.

The configurations of the body 31, the cover 32, and the shaft 33 are the same as those described in the above-described embodiment, and accordingly, a detailed description of the configurations of the body 31, the cover 32, and the shaft 33 is omitted.

The sensor housing 56 is formed in a substantially hexahedral shape by coupling rectangular frames, and a rotation shaft 332 may be installed on a left wall extended upwardly from a left end of the sensor housing 56 through the shaft 33 and the body 31.

A mounting shape 561 may be provided in the sensor housing 56 to have the ball mounted therein, and a bottom surface of the sensor housing 56 may be a curved surface that is downwardly convex so as to allow the ball 551 to be seated thereon.

The ball 551 may be installed in the mounting space 561 of the sensor housing 56, and may be provided to have a larger diameter and a heavier weight than those of the ball 551 described in the above-described embodiment.

The lever guide 58 may be formed in a substantially conical shape having a curved surface that is upwardly convex, so that the lever guide 58 can be seated on an upper surface of the ball 551. Therefore, the upper surface of the lever guide 58 may have an inclined surface that is inclined from the center toward a lower portion of the outside.

A mounting protrusion 581 may protrude from the upper surface of the lever guide 58 to be mounted on a horizontal portion 571 of the sensor lever 57.

The sensor lever 57 may be formed in a substantially '⌐' shape in cross section when viewed from the front.

That is, the sensor lever 57 may include the horizontal portion 571 disposed horizontally, and a vertical portion 572 that is disposed at a right end of the horizontal portion 571 and extends vertically in an upward direction.

In addition, hinge shafts 573 may protrude from front and rear surfaces of the right end of the horizontal portion 571 to be coupled to shaft coupling holes 562 formed on front and rear sidewalls of the sensor housing 56, respectively.

The horizontal portion 571 may be disposed on an upper portion of the lever guide 58 seated on the upper portion of the ball 551, and a support protrusion 574 may be formed on a lower surface of the horizontal portion 571 to be supported on the upper surface of the lever guide 58.

A mounting hole 576 may be formed in the horizontal portion 571 to have the mounting protrusion 581 of the lever guide 58 mounted therein.

The mounting hole 576 may be formed in a long hole shape so that the mounting protrusion 581 is movable along the X-axis direction.

In the sensor device 50 configured as described above, as shown in FIG. 10, even when the installation angle of the body 31 and the cover 32 and the inclination of the backrest are variously changed, the sensor housing 56 and the ball 551 installed therein, and the lever guide 58 and the sensor lever 57 rotate about the shaft 33 and the rotation shaft 332, thereby always maintaining horizontality constantly.

Meanwhile, before the inclination of the vehicle is changed, the horizontal portion 571 maintains horizontality as the support protrusion 574 is supported in contact with the upper surface of the lever guide 58 seated on the upper portion of the ball 551.

Accordingly, the pilot lever 41 having a locking portion 411 locked into a locking recess portion 375 formed at an upper end of the vertical portion 372 is maintained in a state in which the pilot lever moves to the inside of the cover 32, that is, to the left.

When the pilot lever 41 moves to the left as described above, the pilot lever 41 and an emergency tensioning device 40 are decoupled from each other, so that the webbing 21 can be freely pulled out.

On the other hand, when the inclination of the vehicle is changed and the ball 551 moves to one side, for example, to the left, the horizontal portion 57 rotates in the clockwise direction as the support protrusion 574 moves along the inclined upper surface of the lever guide 58.

Accordingly, the sensor lever 57 rotates about the hinge shaft 573 in the clockwise direction, thereby moving the pilot lever 41 to the right.

Therefore, the pilot lever 41 connected with the sensor lever 57 passes through a penetrating hole 322 formed on the cover 32, and moves to the outside of the cover 32, that is, to the right, and protrudes therefrom.

As described above, when the pilot lever 41 protrudes to the outside of the cover 32, the right end of the pilot lever 41 is locked into the locking device 40, so that the locking device 40 performs a locking operation to prevent the webbing 21 from being pulled out.

As described above, the disclosure may omit the weight body and the weight body housing, and may detect a change in the inclination of the vehicle and the inclination of the backrest by using the ball and the sensor housing, and may control the pilot lever by rotating the sensor lever.

Although the invention made by the inventors of the present application has been specifically described according to the above embodiments, the present disclosure is not limited to the above embodiments, and may be modified variously within a scope of the technical essence of the disclosure.

That is, the configuration of the seat belt retractor has been described in the above-described embodiments with reference to FIGS. 2 to 3, but the disclosure is not limited to the above-described configuration, and may be changed to be applied to seat belt retractors having various configurations, for example, the seat belt retractor shown in FIG. 1.

The disclosure is applied to a seat belt retractor technology that installs a sensor lever in a sensor device for detecting a change in the inclination of a vehicle, and moves a pilot lever connected with the sensor lever by rotating the sensor lever about a hinge shaft by movement of a ball assembly according to a change in the inclination of the vehicle.

While the above description constitutes the preferred embodiment of the present invention, it will be appreciated that the invention is susceptible to modification, variation and change without departing from the proper scope and fair meaning of the accompanying claims.

The invention claimed is:

1. A vehicle sensor device for detecting a change in an inclination of a vehicle, the vehicle sensor device comprising:
    a body forming an exterior;
    a cover coupled to one opened surface of the body;
    a weight body housing installed in the body to be rotatable about a shaft that is coupled to the body according to an installation angle and an inclination of the body, the weight body housing having a weight body installed therein;
    a ball assembly configured to detect the change in the inclination of the vehicle;
    a sensor housing installed to allow the ball assembly to move therein; and,
    a sensor lever installed in the sensor housing and rotated by a movement of the ball assembly,
    wherein the sensor lever is configured to linearly reciprocate, by rotation, a pilot lever provided in a locking device.

2. The vehicle sensor device of claim 1,
    wherein the sensor lever comprises a horizontal portion that is horizontally disposed, and a vertical portion that is disposed at one end of the horizontal portion and extends vertically in an upward direction, an upper end of the vertical portion being locked into the pilot lever;
    wherein one pair of hinge shafts are disposed on both ends of the horizontal portion to be rotatably coupled to both sidewalls of the sensor housing;
    wherein a support protrusion is disposed on a lower surface of the horizontal portion to be supported by a weight transmitted from the ball assembly; and,
    wherein, when the ball assembly moves to one side due to the change in the inclination of the vehicle, the horizontal portion is rotated by a change in the center of mass, thereby moving the pilot lever to an outside of the cover.

3. The vehicle sensor device of claim 2, wherein the pilot lever is provided with a hook portion having a diameter smaller than both ends of the pilot lever, and a hook groove portion is provided at an upper end of the vertical portion of the sensor lever so that the hook portion is rotatably coupled with the hook groove portion.

4. The vehicle sensor device of claim 3, wherein the vehicle sensor device maintains a connection between the hook portion of the pilot lever and the hook groove portion of the sensor lever even if the sensor housing rotates about the shaft coupled to the body in association with a gradient variation of a backrest of a seat, so that a normal operation is possible in all angular ranges of the backrest.

5. A seat belt retractor employing a vehicle sensor device, the seat belt retractor comprising:
    a vehicle sensor device comprising a configuration described in claim 1, and configured to detect the change in the inclination of the vehicle;
    a spindle device including a spindle on which a seat belt webbing is wound; and, the locking device configured to perform a locking operation to prevent the seat belt webbing from being pulled out upon a vehicle collision,
wherein the vehicle sensor device is configured to linearly reciprocate the pilot lever to be coupled to or decoupled from the locking device, based on the detected change in the inclination of the vehicle.

6. The seat belt retractor of claim 5, further comprising: a pretensioning device configured to reduce slack by winding the webbing just before the vehicle collision.

7. A vehicle sensor device for detecting a change in an inclination of a vehicle, the vehicle sensor device comprising:
a body forming an exterior;
a cover coupled to one opened surface of the body;
a sensor housing installed in the body to be rotatable about a shaft that is coupled to the body according to an installation angle and an inclination of the body;
a ball installed in the sensor housing to detect the change in the inclination of the vehicle;
a lever guide installed on an upper portion of the ball; and,
a sensor lever rotatably installed in the sensor housing,
wherein the sensor lever is configured to linearly reciprocate, by rotation caused by a movement of the ball, a pilot lever provided in a locking device.

8. The vehicle sensor device of claim 7,
wherein the sensor lever comprises a horizontal portion that is horizontally disposed, and a vertical portion that is disposed at one end of the horizontal portion and extends vertically in an upward direction, an upper end of the vertical portion being locked into the pilot lever;
wherein hinge shafts protrude from both ends of the horizontal portion to be rotatably coupled to both sidewalls of the sensor housing;
wherein the horizontal portion is disposed on an upper portion of the lever guide which is seated on an upper portion of the ball;
wherein a support protrusion is formed on a lower surface of the horizontal portion to be supported on an upper surface of the lever guide; and,
wherein, when the ball moves to one side due to the change in the inclination of the vehicle, the horizontal portion is rotated by a change in the center of mass, thereby moving the pilot lever to an outside of the cover.

9. The vehicle sensor device of claim 8,
wherein the lever guide is formed in a conical shape having a curved surface that is upwardly convex so as to be seated on an upper surface of the ball;
wherein an upper surface of the lever guide has an inclined surface that is inclined downward from a center thereof toward the outside;
wherein a mounting protrusion protrudes from the upper surface of the lever guide to be mounted on the horizontal portion of the sensor lever; and,
wherein a mounting hole is formed in the horizontal portion of the sensor lever to allow the mounting protrusion to be movably mounted therein.

10. The vehicle sensor device of claim 9,
wherein the pilot lever is provided with a locking portion having a smaller diameter than those of both ends thereof; and,
wherein a locking recess portion is formed on an upper end of the vertical portion of the sensor lever to allow the locking portion to be rotatably locked thereinto.

11. The vehicle sensor device of claim 10,
wherein, even when the sensor housing rotates about the shaft coupled to the body in association with a change in an inclination of a backrest of a seat, the vehicle sensor device maintains connection between the locking portion of the pilot lever and the locking recess portion of the sensor lever, so that the vehicle sensor device normally operates within a range of all angles of the backrest.

12. The vehicle sensor device of claim 8, wherein the pilot lever is provided with a hook portion having a diameter smaller than both ends of the pilot lever, and a hook groove portion is provided at an upper end of the vertical portion of the sensor lever so that the hook portion is rotatably coupled with the hook groove portion.

13. The vehicle sensor device of claim 12, wherein the vehicle sensor device maintains a connection between the hook portion of the pilot lever and the hook groove portion of the sensor lever even if the sensor housing rotates about the shaft coupled to the body in association with a gradient variation of a backrest of a seat, so that a normal operation is possible in all angular ranges of the backrest.

14. A seat belt retractor comprising:
the vehicle sensor device having a configuration according to claim 7 and configured to detect the change in inclination of the vehicle;
a spindle device including a spindle on which a seat belt webbing is wound; and
the locking device that performs a locking operation to prevent the seat belt webbing from being pulled out upon a vehicle collision,
wherein the pilot lever is linearly reciprocated based on the change in inclination of the vehicle such that the pilot lever is coupled to or decoupled from the locking device.

15. The seat belt retractor of claim 14, further comprising a pre-tensioning device that winds the webbing just before the vehicle collision to reduce slack.

* * * * *